United States Patent [19]
Hiltner et al.

[11] Patent Number: 5,908,677
[45] Date of Patent: Jun. 1, 1999

[54] PLASTIC CONTAINER MADE FROM POST CONSUMER PLASTIC FILM

[75] Inventors: James E. Hiltner, Sylvania; James M. Fargher, Holland; James N. Herman, Sylvania, all of Ohio

[73] Assignee: Owens-Illinois Plastic Products Inc., Toledo, Ohio

[21] Appl. No.: 08/687,123

[22] Filed: Jul. 24, 1996

Related U.S. Application Data

[63] Continuation of application No. 08/154,413, Nov. 19, 1993, Pat. No. 5,552,198, is a continuation and a division of application No. 08/154,413, which is a continuation-in-part of application No. 07/842,838, Feb. 27, 1992, abandoned, and application No. 07/842,839, Feb. 27, 1992, abandoned.

[51] Int. Cl.⁶ .................................................... C08L 23/00
[52] U.S. Cl. .................. 428/35.7; 428/36.92; 428/542.8; 525/240
[58] Field of Search ................................ 428/35.7, 36.92, 428/542.8, 500; 206/524.6, 524.1; 264/37, 38; 525/240

[56] References Cited

U.S. PATENT DOCUMENTS

| | | | |
|---|---|---|---|
| 3,261,889 | 7/1966 | van't Wout | 260/897 |
| 3,280,220 | 10/1966 | Nelson | 260/897 |
| 3,795,633 | 3/1974 | Golovoy | 260/2.3 |
| 3,869,056 | 3/1975 | Valyi | 260/2.3 |
| 3,878,282 | 4/1975 | Bonis | 264/97 |
| 3,884,855 | 5/1975 | Baumann | 260/2.3 |
| 3,940,001 | 2/1976 | Haefner | 215/1 C |
| 3,976,612 | 8/1976 | Kaji | 260/23 R |
| 4,109,813 | 8/1978 | Valyi | 215/1 C |
| 4,115,499 | 9/1978 | Salyer | 264/122 |
| 4,332,748 | 6/1982 | Fremont | 264/11 |
| 4,390,666 | 6/1983 | Moriguchi | 525/194 |
| 4,495,335 | 1/1985 | Matsuura | 525/240 |
| 4,547,551 | 10/1985 | Bailey | 525/240 |
| 4,550,143 | 10/1985 | Tanaka | 525/240 |
| 4,567,069 | 1/1986 | Jabarin | 428/35 |
| 4,577,768 | 3/1986 | Go | 525/240 |
| 4,737,547 | 4/1988 | White | 525/193 |
| 4,786,688 | 11/1988 | Thiersault | 525/240 |
| 4,923,750 | 5/1990 | Jones | 428/349 |
| 4,990,382 | 2/1991 | Weissenstein | 428/35.7 |
| 5,028,663 | 7/1991 | Chung | 525/198 |
| 5,030,662 | 7/1991 | Banerjie | 521/43.5 |
| 5,073,416 | 12/1991 | Avakian | 428/2 |
| 5,128,212 | 7/1992 | Kneale | 428/516 |
| 5,428,093 | 6/1995 | Lee | 524/317 |
| 5,432,231 | 7/1995 | Su | 525/86 |

FOREIGN PATENT DOCUMENTS

| | | |
|---|---|---|
| 9119763 | 12/1991 | WIPO . |
| 9315887 | 8/1993 | WIPO . |

*Primary Examiner*—Charles Nold

[57] ABSTRACT

A lightweight plastic container is provided which has stress crack resistance and comprises at least one layer comprising post consumer plastic film resin; a fusion blend of post consumer plastic film resin and post consumer plastic milk resin; or a fusion blend of post consumer plastic film resin, post consumer plastic milk resin and virgin high density ethylene copolymer plastic material. The container may be a single layer container or a multilayer container.

23 Claims, 4 Drawing Sheets

PLASTIC CONTAINER MADE FROM POST CONSUMER PLASTIC FILM

This application is a continuation and division of application Ser. No. 08/154,413 filed Nov. 19, 1993, now U.S. Pat. No. 5,552,198, which is a continuation-in-part of application Ser. No. 07/842,838 filed Feb. 27, 1992, now abandoned, and Ser. No. 07/842,839 filed Feb. 27, 1992, now abandoned.

This invention relates to plastic containers and particularly to plastic containers made of post consumer resin.

BACKGROUND AND SUMMARY OF THE INVENTION

In the use of plastic materials for containers such as bottles, it has been found desirable to attempt to recycle and reuse the plastic which is commonly known as post consumer plastic (PCP) or post consumer resin (PCR). In attempts to make containers from such materials, it has been found that the properties have been adversely affected.

Specifically, when containers are made from post consumer high density polyethylene homopolymers (HDPE) container scrap, it has been found that the containers have diminished physical properties and particularly diminished resistance to stress cracking. Such containers made of high density polyethylene homopolymers also have been used for packaging of certain types of liquid detergent products. The use of such containers to package liquid detergent products has been somewhat restricted, however, by reason of the fact that many types of liquid detergent products accelerate the tendency of the container to exhibit stress cracking. Stress cracking is evidenced by the appearance of hazy cracks in the container which are aesthetically unpleasing to the ultimate consumer. In extreme cases, stress cracking can lead to leakage of the contents from the container. Stress cracking can occur when the containers are for liquid products including liquid detergents and liquid hypochlorite bleaches.

It has been suggested that such post consumer resin be utilized because large quantities of high density polyethylene post consumer resin are available due to the extensive use of high density polyethylene in large containers for milk and water. Post consumer resin from such containers contains contaminants of paper and other plastic resins, for example, from closures such that it has been generally thought that it can not be used to make satisfactory plastic containers.

In copending application Ser. No. 07/842,938, filed Feb. 27, 1992, a plastic container is made from a fusion blend of a post consumer resin and ethylene polymers comprising post consumer resin of homopolymer high density polyethylene plastic and virgin high density polyethylene copolymer resin. The physical properties of the container including stress crack resistance are maintained as contrasted to the loss of such physical properties that have been heretofore resulted from the use of post consumer resins. Pellets of a homopolymer high density polyethylene resin from post consumer resin (PCR) and pellets of a virgin high density polyethylene copolymer were mixed and fusion blended. Containers were blow molded and subjected to testing for stress cracking, top load and drop impact. The blends of this invention contain about 15–50% by weight of post consumer resin and about 50–85% by weight of virgin high density polyethylene copolymer resin.

As set forth in copending application Ser. No. 07/842,838, filed Feb. 27, 1992, plastic containers are made from a fusion blend of a post consumer resin and a small amount of linear low density polyethylene resin. In another form, containers are made from a blend of post consumer homopolymer high density polyethylene resin and linear low density polyethylene. The physical properties of the container including stress crack resistance are maintained as contrasted to the loss of such physical properties that have been heretofore resulted from the use of post consumer resins. Pellets or flakes of a homopolymer high density polyethylene resin from post consumer resin (PCR) and pellets of linear low density polyethylene were mixed and fusion blended. The containers were blow molded and subjected to testing for stress cracking, top load and drop impact. In another form the blend included virgin high density copolymer resin. The blends contain about 10–95% by weight of post consumer resin, 0–75% by weight of virgin high density polyethylene copolymer and 2.5–25% by weight of linear low density polyethylene resin.

Among the objectives of the present invention are to provide fusion blends which utilize post consumer film resin either entirely or in fusion blends of post consumer film resin, post consumer milk resin, and virgin plastic material.

In accordance with the invention, a lightweight plastic container is provided which has stress crack resistance and comprises at least one layer comprising post consumer plastic film resin; a fusion blend of post consumer plastic film resin and post consumer plastic milk resin; or a fusion blend of post consumer plastic film resin, post consumer plastic milk resin and virgin high density ethylene copolymer plastic material. The container may be a single layer container or a multilayer container.

DESCRIPTION OF THE PREFERRED EMBODIMENTS

Figure 1:
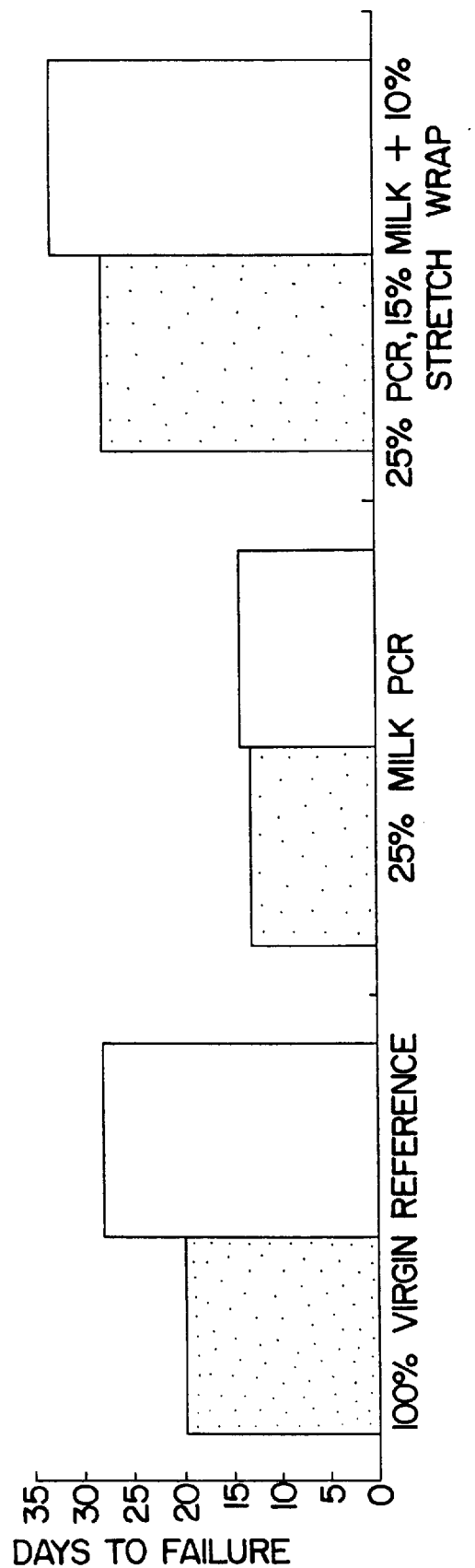
FIGS. 1–4 are bar charts illustrating the test results.

In accordance with the invention, a lightweight plastic container is provided which has stress crack resistance and comprises at least one layer comprising post consumer plastic film resin; a fusion blend of post consumer plastic film resin and post consumer plastic milk resin; or a fusion blend of post consumer plastic film resin, post consumer plastic milk resin and virgin plastic material. The container may be a single layer container or a multilayer container.

As used herein, consumer film resin comprises post consumer stretch wrap film which contains 35–95% linear low density polyethylene (LLDP) and other polymers such as low density polyethylene, EVA, and small amounts of other resins.

Such post consumer plastic film resin has the properties set forth in the following TABLE I:

TABLE I

| PROPERTY | SPECIFIED VALUE |
| --- | --- |
| Material Density | 0.915–0.930 Grams/cc |
| Melt Flow-Melt Index | 0.5–2.0 DGM |
| Crystalline Melt Temp (Peak) | 120–130° C. |
| Moisture | <0.05% |
| Pellet Size | 70 Pellets/Grain, Min |
| Contamination | |
| Paper | <0.01% |
| Metal | None |
| Other (glass, stone) | None |

Post consumer milk resin contains primarily the plastic from high density polyethylene homopolymer containers used for packaging milk and small amounts of colored plastic containers and possible polypropylene resin from syrup bottles, multilayer ketchup bottles and caps. Such post consumer resin has the properties set forth in the following TABLE II:

TABLE II

| PROPERTY | SPECIFIED VALUE |
|---|---|
| Material Density | .961 ± .002 natural |
| Melt Flow - Melt Index | 0.75 ± 0.2 DGM |
| Polypropylene (Includes Multilayer Bottles) | Not to exceed 3% |
| Fines | <0.01% |
| Moisture | <0.05% |
| Contamination | |
| Paper | <0.01% |
| Plastic-Dens. >1.0 gm/cc | <0.1% |
| Metal fragments | None |
| Other (glass, stone) | None |

As used herein, the virgin high density copolymer resin contains linear high-density ethylene polymer. The linear high-density ethylene copolymer includes in the blends will have a density of at least about 0.94 gm/ml, a melt index of less than about 0.5 gm/10 min. and will have polymerized therein at least about 98 mol % ethylene with any comonomer polymerized therein being an alpha-monoolefin containing about 3 to 12 carbon atoms. Such linear high-density ethylene polymers are known and reported in the art and are commercially available from numerous commercial producers. Such linear high-density ethylene polymers are prepared by polymerizing ethylene, optionally in the presence of an alphamonoolefin comonomer containing 4 to 12 carbon atoms in the presence of certain metallic catalysts such as chromium catalysts, e.g. $CrO_3$ supported on silica-alumina supports, and the Ziegler-Natta catalysts, e.g. $TiCl_3$ employed in conjunction with certain aluminum alkyl cocatalysts. The requisite density and melt index desired in the polymer are obtained by proper control of polymerization conditions including temperature, pressure comonomer concentration, and the concentration of telegenating agents such as hydrogen. The preferred linear high-density ethylene polymers will have a density of at least about 0.94 gm/ml. The especially preferred polymers will have a density of at least about 0.95 gm/ml.

Stress crack resistance is conventionally conducted with test methods as established by Technical Bulletin PBI 11-1978 of the Plastic Bottle Institute, Rev.1-1991 or ASTM D2561-70 (Reapproved 1989).

It has been found that post consumer film resin can be used in a single layer container alone; a fusion blend of post consumer film resin and post consumer milk resin; a fusion blend of post consumer film resin and virgin high density polyethylene copolymer; or a fusion blend of post consumer film resin, post consumer milk resin or virgin copolymer resin or homopolymer resin.

In a single or monolayer plastic container comprising post consumer film resin and post consumer milk resin, the post consumer film resin may vary from about 10% to 100% by weight and the post consumer milk resin may vary from about 10% to 90% by weight.

In another form, the single or monolayer container may comprise post consumer film resin of about 10% to 90% of fusion blend by weight and the virgin high density polyethylene copolymer of about 10% to 90% of fusion blend by weight.

In a multilayer container, for example, a three-layer container, the outer and inner layers comprise a fusion blend of post consumer film resin and post consumer milk resin comprising about 10% to 100% by weight of post consumer film resin and about 0% to 90% by weight of post consumer milk resin. The intermediate layer comprises 0% to 100% of post consumer resin or alternatively the intermediate layer may comprise virgin high density ethylene copolymer resin in the amount 0% to 100% by weight with regrind. The outer layer may comprise the same components as the inner layer. In some instances, the outer layer may comprise 0% to 100% post consumer resin consisting of post consumer milk resin; or a fusion blend of post consumer film resin and post consumer milk resin.

It has been found that stress crack resistance of either the single layer container or multilayer container is at least equal to that of the virgin material and in some cases betters and enhances the performance of the container, as hereinafter described.

The use of post consumer film resin enhances the applications for light weight containers such as refill packages. It also makes 100% post consumer plastic packages feasible for some applications which would otherwise fail for ESCR performance.

Use of post consumer stretch wrap film potentially reduces the risk of product contamination when compared to milk post consumer milk resins. Furthermore, the sources of collection for post consumer stretch wrap can be controlled and monitored more readily than a municipal collection systems can control bottle sources.

The post consumer stretch wrap material may also provide an effective barrier to contaminate migration if it is used in a layer between the product and the contaminate.

Extensive tests have been provided as summarized in the following TABLES III and IV:

TABLE III

Monolayer Bottle Tests

Figure 2:
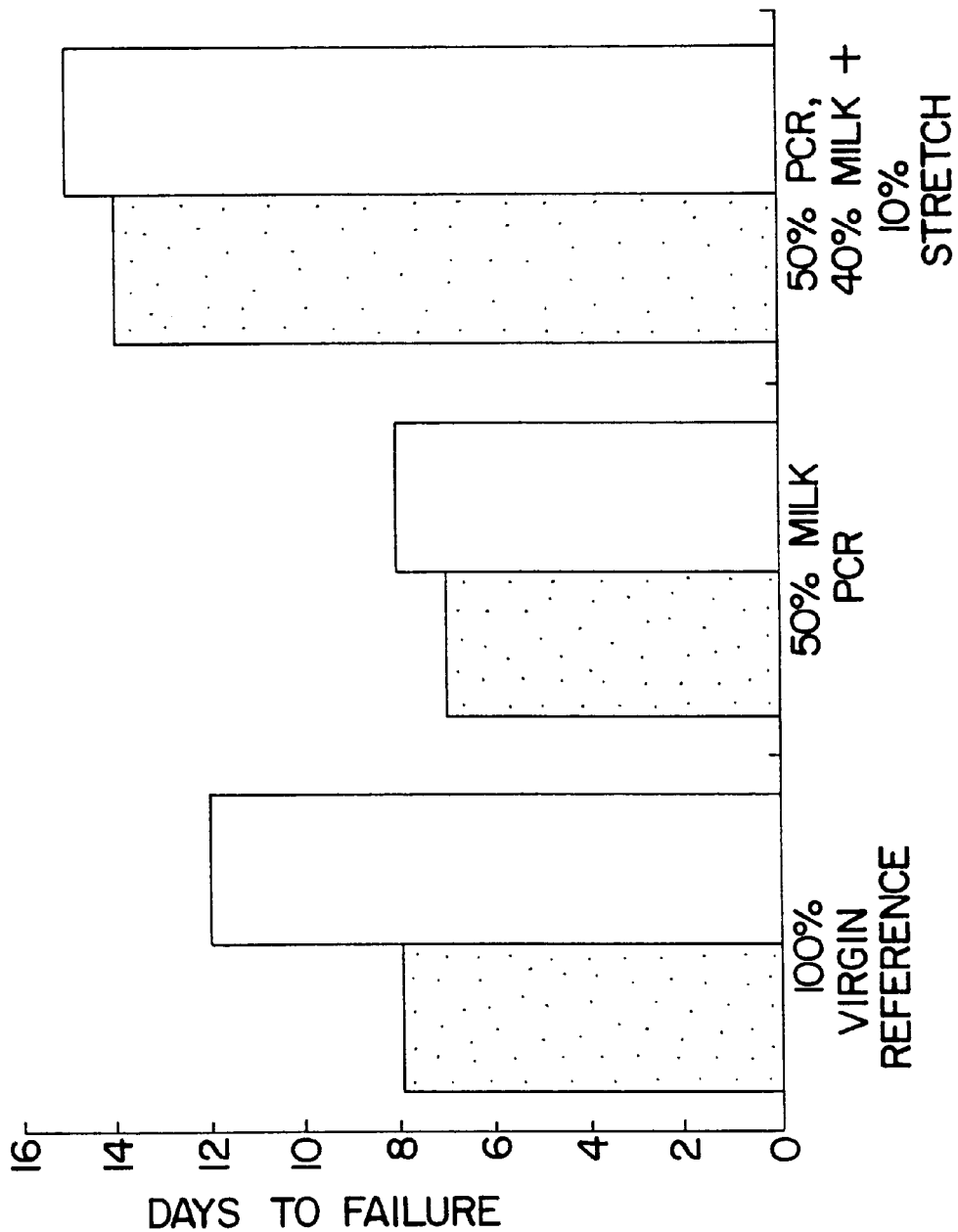

| % PCR S.W. | % PCR Milk | % Virg HDPE* | Bottle | Type of Virgin | Product Tested | Test Conditions | First Failure | F 50 | Comments |
|---|---|---|---|---|---|---|---|---|---|
| 0% | 0% | 100% | 32 Kodak | Typical Copolymer HDPE | Developer | | 20 | 28 | See FIG. 1 |
| 0% | 25% | 75% | 32 Kodak | Typical Copolymer HDPE | Developer | | 13 | 14 | See FIG. 1 |
| 10% | 15% | 75% | 32 Kodak | Typical Copolymer HDPE | Developer | | 28 | 33 | See FIG. 1 |
| 0% | 0% | 100% | 128 Clorox | Typical Copolymer HDPE | Bleach | 120 F Top Load | 8 | 12 | See FIG. 2 |
| 0% | 50% | 50% | 128 Clorox | Typical Copolymer HDPE | Bleach | 120 F Top Load | 7 | 8 | See FIG. 2 |
| 10% | 40% | 50% | 128 Clorox | Typical Copolymer HDPE | Bleach | 120 F Top Load | 14 | >15 | See FIG. 2 |

TABLE III-continued

Stress Rupture Material Tests

| S.W. | Milk | HDPE | Virgin Type | Type of Virgin | F 50 |
|---|---|---|---|---|---|
| 0% | 0% | 100% | Copolymer LC 732 | Typical Copolymer HDPE | 40 |
| 0% | 25% | 75% | Copolymer LC 732 | Typical Copolymer HDPE | 15 |
| 10% | 15% | 75% | Copolymer LC 732 | Typical Copolymer HDPE | 99 |

TABLE IV

Layered Bottle Tests (Material % Indicate Inside Layer)

Inside Layer Composition

Figure 4:
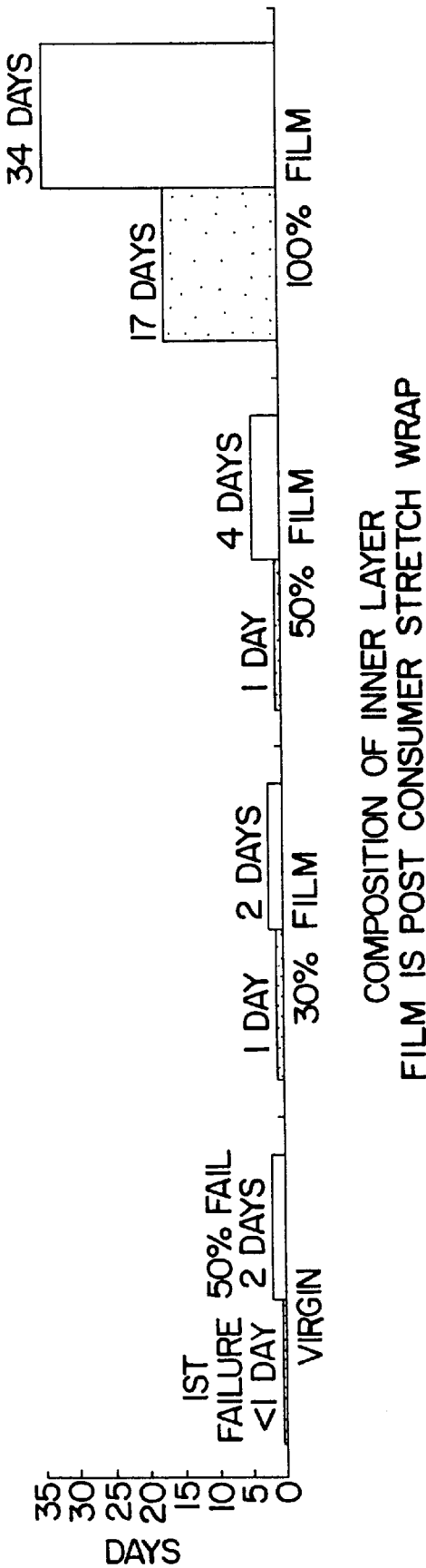

| % PCR S.W. | % PCR Milk | % Virg HDPE* | Bottle Type | Composition of other layers | Product Tested | Test Conditions | First Failure | F 50 50% fail | Comments |
|---|---|---|---|---|---|---|---|---|---|
| 0% | 0% | 100% | 24 oz. Ultra Lt. Handl | 100% Virgin copolymer HDPE | Joy | 140° F. | <1 | 2 | See FIG. 4 |
| 25% | 75% | 0% | 24 oz. Ultra Lt. Handl | PCR Milk & Pigmented | Joy | 140° F. | 1 | 2 | See FIG. 4 |
| 50% | 50% | 0% | 24 oz. Ultra Lt. Handl | PCR Milk & Pigmented | Joy | 140° F. | 2 | 3 | See FIG. 4 |
| 100% | 0% | 0% | 24 oz. Ultra Lt. Handl | PCR Milk | Joy | 140° F. | 17 | 34 | See FIG. 4 |
| | | | 24 oz. Oval with handle like gripping feature, weighting approx. 25 grams, typical wall thickness 0.060–0.015* | | | | | | |
| 10% | 90% | 0% | 64 oz. Downy | PCR Milk | Downy | 120° F. w/10 lb load | 35 | >35 | |
| 0% | 100% | 0% | 64 oz. Downy | PCR Milk | Downy | 120° F. w/10 lb load | 27 | 35 | |
| | | | 64 oz. oval with handtw and drain back spout configuration, weighting approx. 72 grams, typical wall thickness 0.015–0.030* | | | | | | |
| | 90% | 10%* | 64 oz. Downy | PCR Milk | Downy | 120° F. w/10 lb load | 13 | >30 | |
| 10% | 90% | | 64 oz. Downy | PCR Milk | Downy | 120° F. w/10 lb load | 10 | 27 | |
| | 90% | 10%* | 64 oz. Downy | PCR Milk | Joy | 140° F. | 2 | 2 | |
| 10% | 90% | | 64 oz. Downy | PCR Milk | Joy | 140° F. | 1 | 1 | |
| | 90% | 10%* | 40 oz. Downy | PCR Milk | Downy | 120° F. w/10 lb load | >30 | >30 | |
| 10% | 90% | | 40 oz. Downy | PCR Milk | Downy | 120° F. w/10 lb load | >30 | >30 | |
| | | | 40 oz. Oval with handle and drain back spout configuration, weighting approx. 57 grams, typical will thickness 0.015–0.030 | | | | | | |
| | 90% | 10%* | 40 oz. Downy | PCR Milk | Joy | 140° F. | >7 | >7 | |
| 10% | 90% | | 40 oz. Downy | PCR Milk | Joy | 140° F. | 6 | >7 | |

*10% Virgin LLDPE was used in this example, not HDPE.

TABLE III includes single layer or monolayer bottle results and Stress Rupture Test Data. Stress Rupture tests frequently indicate the material performance of single layer bottles.

The first group of data on TABLE III shows the performance of 32 oz. non handle bottles and is illustrated in FIG. 1. The reference containers made with 100% virgin experienced the first failures in 20 days and 50% failed in 28 days. When 25% PCR is incorporated in the form of milk PCR, the environmental stress crack resistance is reduced to 13 days for the first failure and 14 days for 50% of the failures. The blend with 25% PCR, 10% stretch wrap and 15% milk the environmental stress crack resistance is superior to the prior variables with 28 days to the first failure and 33 days to reach 50% failures. The bottles were tested using a modified ASTM D 2561 Procedure A, modified by using 10 bottles and Kodak Flux AR Developer-Replenisher B as the stress cracking agent.

The second group of data in TABLE III and illustrated in FIG. 2 shows material performance for one gallon bleach containers and 50% PCR. The reference containers made with 100% virgin experienced the first failure on day eight and 50% failures on day 12. When 50% PCR in the form of milk is used, the container performance is again lessened to 7 days for the first failure and 8 for 50% failures. When 50% PCR bottles are made using 40% milk and 10% stretch wrap, the environmental stress crack resistance is again superior to the virgin and 50% milk only containers. The first failures occurred on day 14 and on day 15 the test was terminated before 50% of the containers had failed. The bottles were tested using a procedure described in PBI Technical Bulletin PBI 11-1978 Rev 1-1991. The procedure was followed using Clorox Fresh Scent Bleach and 5/16" deflection with 10 bottles.

Figure 3:
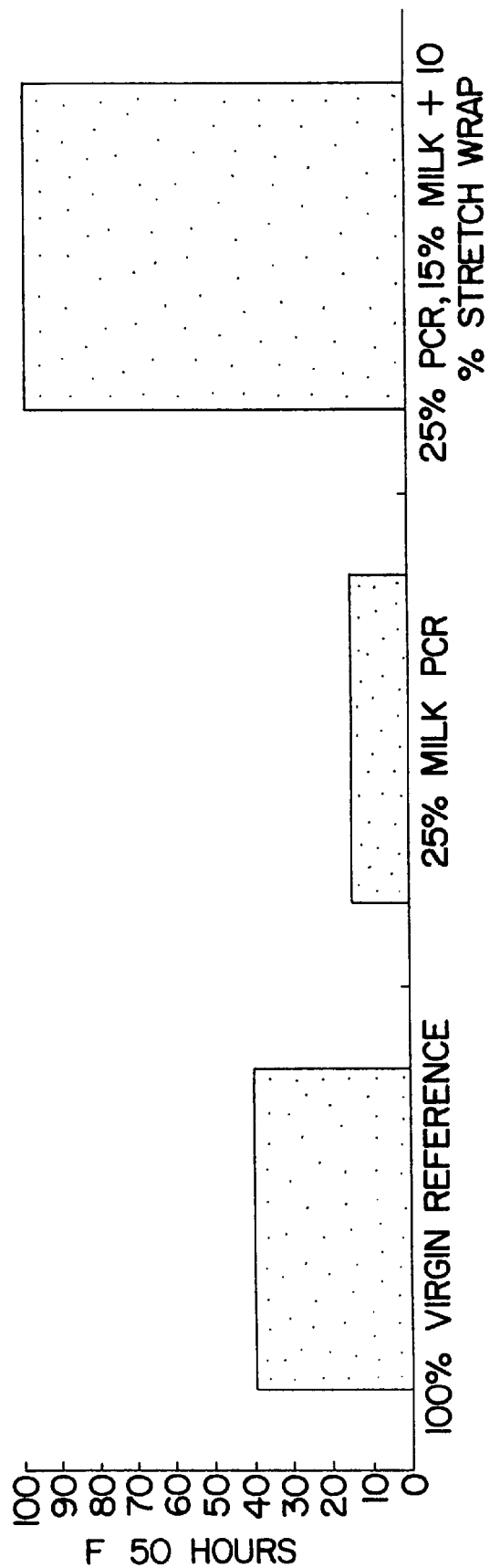

The third group of data on TABLE III indicates stress rupture results and is illustrated in FIG. 3. When a typical copolymer for reference is tested an $F_{50}$ value of 40 hours was measured. The same virgin when blended with 25% milk PCR has a reduced $F_{50}$ value of 15 hours. When 25% PCR was incorporated in the amounts of 10% stretch wrap and 15% milk superior results occurred, the $F_{50}$ was 99 hours. The test procedure is described in ASTM D 2552-69.

The TABLE IV data indicates results for several layered bottle configurations.

The Environmental Stress Crack Resistance of a 24 oz. Ultra light containers (FIG. 4 and TABLE IV) was tested using monolayer virgin copolymer HDPE as a reference point. The first failures occurred in less than one day. One half of the samples failed in two days. When bottles were made using a blend of 25% stretch wrap resin with 75% post consumer milk material on the inside layer of a three layer bottle, the environmental stress crack resistance was the same or slightly improved over the 100% virgin bottles as the first failure occurred after one day. As the amount of stretch wrap resin is increased to 50% and then 100%, the environmental stress crack resistance improved dramatically, e.g., the first failures occurred on day 2 and 17, respectively, and 50% of the bottles failed on day 3 and 34, respectively. The bottles were tested using a modified ASTM D 2561 Procedure A, modified by using 10 bottles and Joy dish washing detergent as the stress cracking agent.

TABLE IV data indicates the performance of layered 64 oz. Downy bottles made of 100% post consumer milk material was similar in environmental stress crack performance when 10% stretch wrap resin was added to the inside layer. While the first failures occurred in 27 days v. 35 and 50% of the failures occurred in 35 days, both results are similar and acceptable for this product. The test method described in PBI 11-1978 Rev 1-1991 was used with a 10 pound top load and Downy Fabric Softener as the stress cracking agent.

The remaining data shown on TABLE IV indicates that stretch wrap resin when substituted for virgin LLDPE provides similar environmental stress crack resistance.

We claim:

1. A fusion blend for forming a hollow lightweight plastic container having stress crack resistance comprising
    a fusion blend including post consumer film resin and a resin selected from the group consisting essentially of post consumer milk resin which comprises primarily high density polyethylene homopolymer from milk containers virgin high density polyethylene copolymer resin, virgin high density homopolymer resin or fusion blends thereof.

2. The fusion blend set forth in claim 1 wherein said resin selected from the group comprises a post consumer milk resin.

3. The fusion blend set forth in claim 2 wherein said post consumer milk resin comprises the major portion of said fusion blend, by weight.

4. The fusion blend set forth in claim 2 wherein said post consumer film resin comprises about 10% to 100% of the fusion blend by weight and the post consumer milk resin comprises about 10% to 90% of the fusion blend by weight.

5. The fusion blend set forth in claim 1 wherein said resin selected from the group comprises virgin high density polyethylene copolymer.

6. The fusion blend set forth in claim 5 wherein said virgin high density copolymer comprises the major portion of said fusion blend, by weight.

7. The fusion blend set forth in claim 5 wherein said virgin high density polyethylene copolymer comprises about 10% to 90% of the fusion blend by weight and the post consumer film resin comprises about 10% to 100% of the fusion blend by weight.

8. The fusion blend set forth in claim 5 wherein said fusion blend comprises 10% post consumer film rsin by weight, 15% post consumer milk resin by weight, and 75% virgin high density polyethylene copolymer by weight.

9. The fusion blend set forth in claim 5 wherein said fusion blend comprises 10% post consumer film resin by weight, 40% post consumer milk resin by weight, and 50% virgin high density polyethylene copolymer by weight.

10. The fusion blend set forth in claim 1 wherein
    said post consumer film resin having a material density of 0.915–0.930 grams/cc and a melt index of 0.5–2.0 DGM,
    said post consumner milk resin having a material density of 0.961±0.002 and a melt index of 0.75±0.2 DGM,
    said virgin high density polyethylene copolymer resin having a density of at least 0.94 gm/ml and a melt index of less than 0.5 gm/10 min.

11. The fusion blend set forth in claim 10 wherein said post consumer film resin comprises about 10% to 100% of the fusion blend by weight and said post consumer milk resin comprises about 10% to 90% of the fusion blend by weight.

12. The fusion blend set forth in claim 1 wherein said fusion blend consists essentially of a fusion blend of said post consumer film resin and a post consumer milk resin.

13. The fusion blend set forth in claim 12 wherein said post consumer milk resin comprises the major porton of said fusion blend of said post consumer film resin and said post consumer milk resin by weight.

14. The fusion blend set forth in claim 12 wherein said post consumer film resin comprises about 10% to 90% of the fusion blend by weight and said post consumer milk resin comprises about 10% to 90% of the fusion blend by weight.

15. The fusion blend set forth in claim 10 wherein said resin selected from the group comprises virgin high density copolymer.

16. The fusion blend set forth in claim 15 wherein said virgin high density polyethylene copolymer comprises about 10% to 90% of the fusion blend by weight and the post consumer film resin comprises about 10% to 90% of the fusion blend by weight.

17. The fusion blend set forth in claim 16 wherein said fusion blend consists essentially of said post consumer film resin and virgin high density polyethylene copolymer.

18. The fusion blend set forth in claim 15 wherein said virgin high density copolymer comprises the major portion of said fusion blend by weight.

19. The fusion blend set forth in claim 1 wherein said fusion blend comprises 10% post consumer film resin by weight, 15% post consumer milk resin by weight, and 75% virgin high density polyethylene copolymer by weight.

20. The fusion blend set forth in claim 1 wherein said fusion blend comprises 10% post consumer film resin by weight, 40% post consumer milk resin by weight, and 50% virgin high density polyethylene copolymer by weight.

21. The fusion blend set forth in claim 1 wherein said fusion blend comprises a post consumer film resin and a post consumer milk resin,
    said post consumer film resin having a material density of 0.915–0.930 grams/cc and a melt index of 0.5–2.0 DGM,
    said post consumer milk resin having a material density of 0.961±0.002 and a melt index of 0.75±0.2 DGM.

22. A plastic container having stress crack resistance comprising a single plastic layer which comprises a fusion blend of a post consumer film resin and a resin selected from the group consisting essentially of post consumer milk resin which comprises primarily high density polyethylene homopolymer from milk containers, virgin high density polyethylene copolymer resin, virgin high density homopolymer resin or fusion blends thereof,
    said post consumer film resin having a material density of 0.915–0.930 grams/cc and a melt index of 0.5–2.0 DGM,
    said post consumer milk resin having a material density of 0.961±0.002 and a melt index of 0.75±0.2 DGM,
    said virgin high density polyethylene copolymer resin having a density of at least 0.94 gm/ml and a melt index of less than 0.5 gm/10 min,
    said virgin high density polyethylene homopolymer resin having a density of at least 0.96 gm/ml and a melt index of less than 1.0 gm/10 min.

23. The plastic container set forth in claim 22 wherein said first layer comprises a resin selected from the group consisting of said post consumer milk resin and said post consumer milk resin comprises primarily high density polyethylene homopolymer from milk containers, said primarily high density homopolymer having a material density of 0.961±0.002 grams/cc and a melt flow—melt index of 0.75±0.2 DGM, said post consumer film resin and virgin high density copolymer or fusion blends thereof.

* * * * *